Feb. 13, 1940.  W. W. SLOANE  2,189,869
LOADING MACHINE
Filed May 26, 1938  3 Sheets-Sheet 1
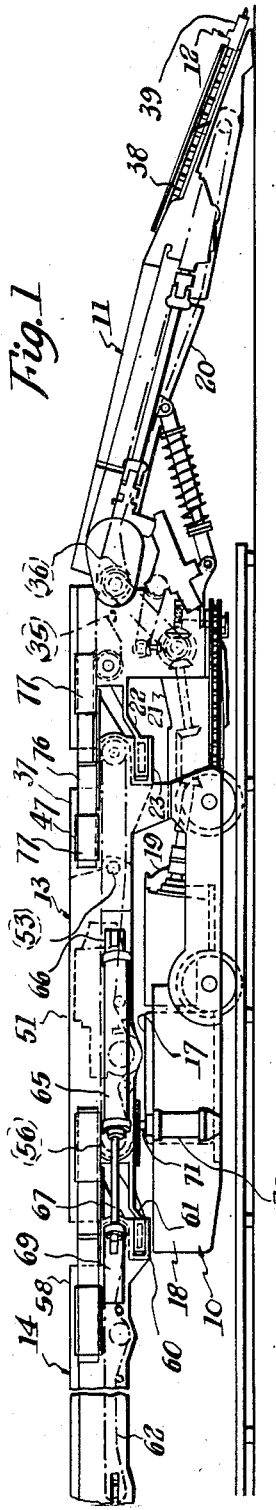
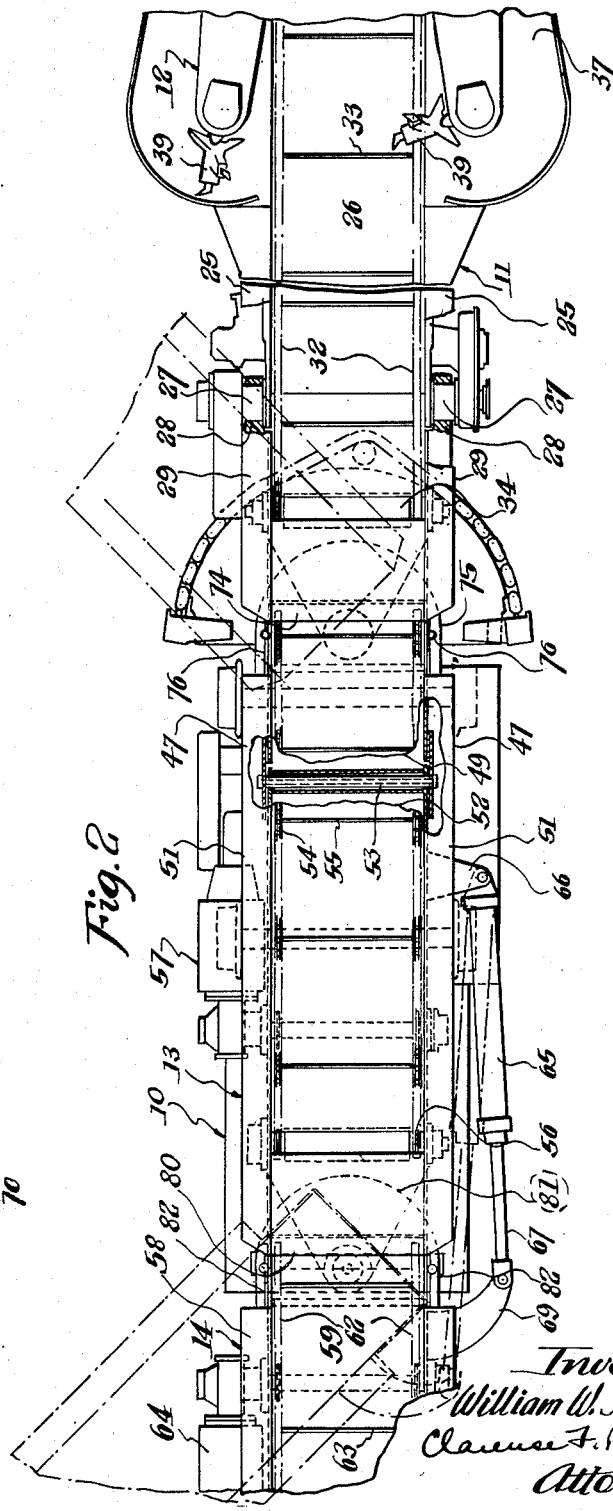
Inventor
William W. Sloane
Clarence F. Poole
Attorney Feb. 13, 1940.     W. W. SLOANE     2,189,869
LOADING MACHINE
Filed May 26, 1938     3 Sheets-Sheet 2
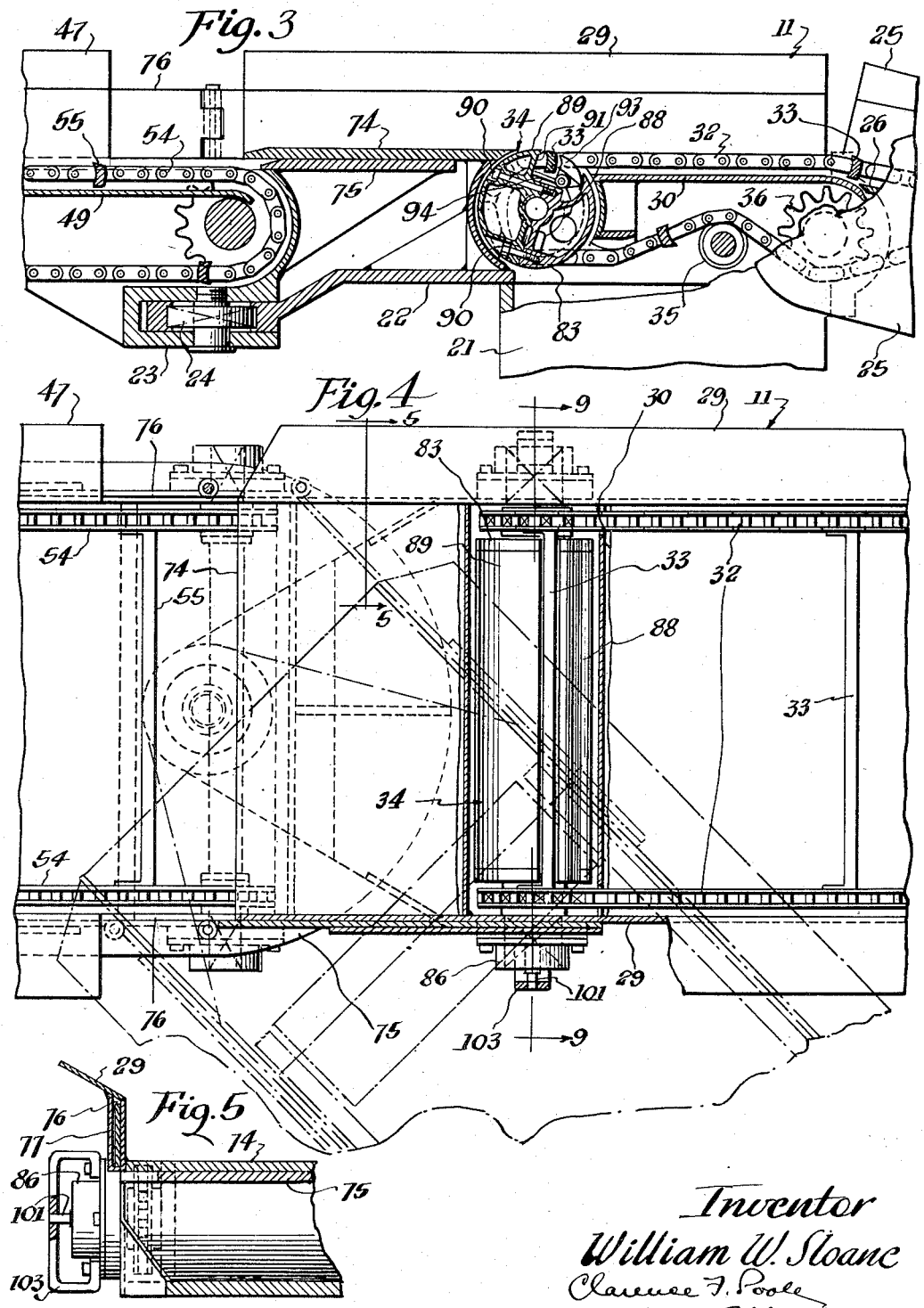
Inventor
William W. Sloane
Clarence F. Poole
Attorney

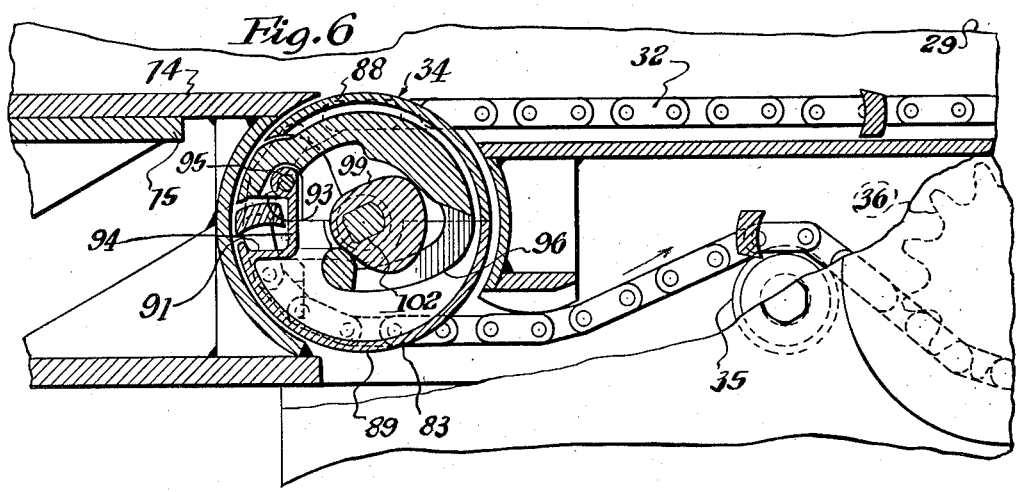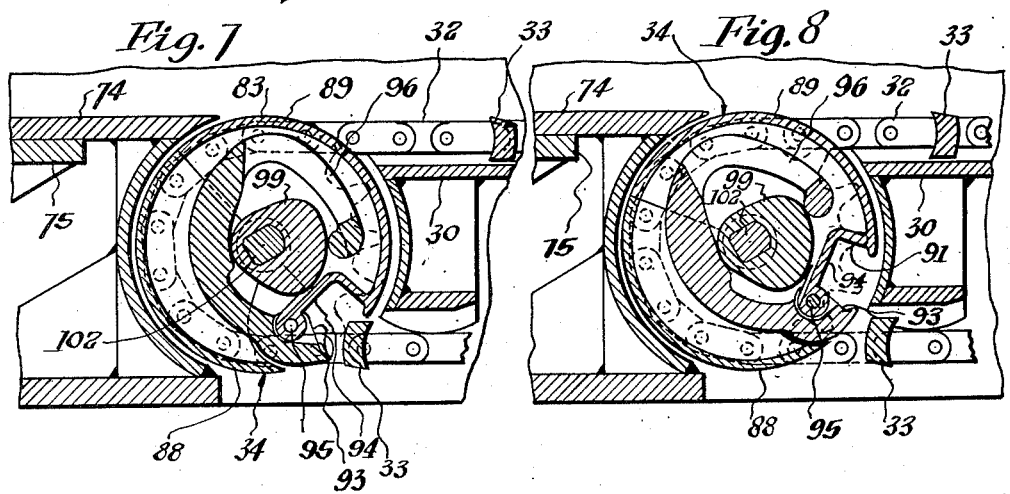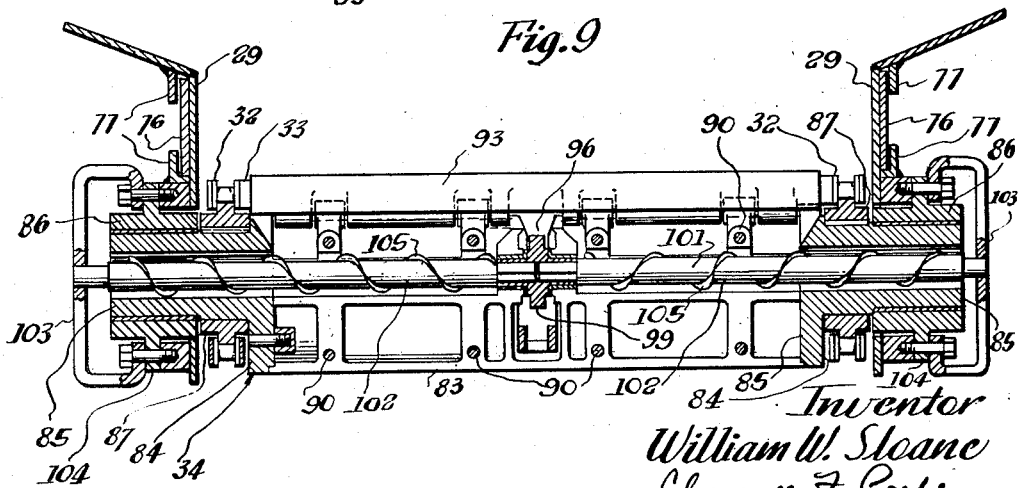

Patented Feb. 13, 1940

2,189,869

UNITED STATES PATENT OFFICE 2,189,869

LOADING MACHINE

William W. Sloane, Chicago, Ill., assignor to Goodman Manufacturing Company, Chicago, Ill., a corporation of Illinois Application May 26, 1938, Serial No. 210,228

21 Claims. (Cl. 198—7)

This invention relates to improvements in loading machines of the type adapted to pick up and load material into a car from the working face of a mine.

Heretofore, face loading machines have been provided with elevating and discharge conveyers arranged in cascade relationship with respect to each other so that the elevating conveyer may discharge into the discharge conveyer. Where it is desired to construct a machine to operate in thin measures of coal, the vertical space utilized by this arrangement of conveyers is objectionable since it does not permit the height of the machine to be brought down to those low limits necessary to permit the machine to traverse and operate in these low seams of coal. Face loading machines also have been provided with a single flexible conveyer extending from one end of the machine to the other. The disadvantages of this type of conveyer are that, in order for the conveyer to flex to discharge to one side or the other of the machine, a single center strand chain having flights projecting from opposite sides thereof must be used. This type of conveyer has numerous disadvantages, a few of which are that the chain and flights frequently break due to the cantilever action of the flights on the chain, and the conveyer does not have the carrying capacity of a double chain conveyer having the flights connected between the chains, especially where it is necessary to provide a center guide for the chain, for the reason that the guide in the center of the conveyer causes the greatest amount of material to be carried by the outer ends of the flights instead of along the center of the conveyer.

Among the objects of my invention are to provide a loading machine for operation in thin seams of coal which includes a forwardly projecting gathering and loading conveyer adjustable about both horizontal and vertical axes disposed adjacent the front of the machine, a central transfer conveyer extending along the machine in substantially the same plane as the discharge end of the elevating conveyer, and a rear discharge conveyer horizontally adjustable about a vertical axis disposed adjacent the rear of the machine and vertically adjustable about a horizontal transverse axis, the arrangement of which conveyers is such that material may be transferred from one conveyer to the other, with no appreciable drop between the conveyers, when said conveyers are in various positions of adjustment with respect to each other.

Another object of my invention is to provide a direction changing device at the discharge end of the elevating and transfer conveyers, so arranged as to successively receive the flights of the conveyer as they round said direction changing device and permit the material on the conveyer to be moved over said direction changing device and onto the next succeeding conveyer.

Still another object of my invention is to provide a novel form of recessed direction changing device for successively receiving the flights of the conveyer as they pass therearound, and to provide a novel form of cam arrangement to open up the recess to permit successive flights of the conveyer to enter, and close after the respective flight has been received therein, and again open up to permit the respective flight to pass therefrom.

Other objects of my invention will appear from time to time as the accompanying specification proceeds.

My invention may be more clearly understood with reference to the accompanying drawings wherein:

Figure 1 is a side elevation of a loading machine constructed in accordance with my invention;

Figure 2 is a plan view of the device shown in Figure 1, with parts broken away and other parts shown in substantially horizontal section;

Figure 3 is an enlarged partial fragmentary longitudinal sectional view showing the discharge end of the elevating conveyer and the receiving end of the transfer conveyer in substantially longitudinal section;

Figure 4 is a plan view of the portion of the machine shown in Figure 3, drawn to substantially the same scale as Figure 3;

Figure 5 is a partial fragmentary transverse sectional view taken substantially along line 5—5 of Figure 4;

Figure 6 is an enlarged detail view showing the discharge end of the elevating conveyer, with different parts in longitudinal section than in Figure 3, and showing the direction changing device in a different phase of the cycle of rotation than in Figure 3;

Figures 7 and 8 are detail views of the discharge end of the elevating conveyer in longitudinal section, drawn to the same scale as Figure 6, and each showing the direction changing device in different advance phases of its cycle of rotation; and Figure 9 is a partial fragmentary transverse sectional view taken substantially along line 9—9 of Figure 4.

In the drawings, my invention is illustrated as being embodied in a face loading machine of the track mounted type particularly adapted for use underground in coal mines, and includes a wheeled truck or main frame 10, an inclined elevating conveyer 11 projecting from the front end of said main frame and having gathering mechanism 12 on the forward end thereof, a central transfer conveyer 13 extending along a central portion of said main frame and having a discharge portion pivotally adjustable about a horizontal transverse axis disposed intermediate its ends, and a discharge conveyer 14 extending rearwardly from said transfer conveyer and mounted for pivotal movement with respect thereto about a vertical axis, and for pivotal adjustment in a vertical plane about the axis of vertical adjustment of the discharge portion of said transfer conveyer. Said conveyers are arranged in alignment with each other and, as herein shown, the vertical displacement between the discharge and receiving ends of each is very slight so that one conveyer may discharge into the other without the usual drop.

The main operating parts of the machine are driven from a motor 17 mounted at the rear end of the main frame 10 between side frame members 18, 18 thereof. Said motor has power connections for driving the truck wheels, for adjustably swinging the gathering and loading element in a horizontal plane, for raising or lowering said gathering and loading element relative to the ground and for driving the gathering devices and associated conveyer.

These power driving connections are similar to those described in Patent No. 2,027,091, which issued to Frank Cartlidge on January 7, 1936, although said drive connections are of a more compact arrangement in the present invention, and are no part of my present invention so will not herein be described in detail.

A gear housing and support frame 21 rests on a forwardly projecting portion of the truck frame 10 and is slidably mounted on said frame for pivotal movement about a vertical axis disposed forwardly of the front track wheels, in a manner similar to that shown and described in the beforementioned prior Patent No. 2,027,091. The mounting for said frame will not herein be shown or described in detail excepting to point out that said swinging frame as shown in the present application is provided with an additional bearing support for its upper end which includes an arm 22 projecting rearwardly from the upper end thereof. Said arm is journaled in a bracket portion 23 of the main frame 10 on a ball bearing 24 (see Figures 1 and 3).

The elevating conveyer 11 is provided with a forwardly inclined elevating section which includes a pair of spaced apart upright longitudinally extending side frame members 25, 25 having upwardly and outwardly flared sides. Said side frame members are connected together by a plate 26 extending therealong and forming a bottom for the conveyer.

The forward end of the elevating conveyer is vertically adjustable about a horizontal transverse axis coaxial with the center of a pair of bearing bosses 27, 27 which project laterally outwardly from the rear ends of the side frame members 25, 25. Said bearing bosses have connection with the support frame 21 on a pair of spaced apart bearing support members 28, 28 at the upper end of said frame (see Figure 2).

The elevating conveyer 11 is also provided with a relatively horizontal discharge section which includes a pair of side frame members 29, 29 mounted on the support frame 21 and fixed from vertical movement with respect thereto. A horizontal plate 30 is provided to connect said side frame members together and form a bottom for the conveyer.

The conveying elements of the elevating conveyer include a pair of spaced apart endless chains 32, 32 having transversely disposed flights 33, 33 connected therebetween at intervals therealong. Said chains extend upwardly from the lower end of the plate 26 along said plate and the plate 30 and around a direction changing device generally indicated by reference character 34 at the discharge end of the conveyer. From said direction changing device, said chains extend forwardly along the underside of the plate 30, over idler rollers 35, 35, under drive sprockets 36, 36 coaxial with the axis of pivotal movement of said inclined portion of said conveyer and downwardly along the underside of the plate 26 to a direction changing device at the forward end thereof, about which it turns.

The gathering mechanism 12 on the forward end of the elevating conveyer may be of a type similar to that shown in a prior Patent No. 2,066,137 which issued to Frank Cartlidge December 29, 1936, and includes an apron 37 extending across the forward end of the side frame members 25, 25 and upwardly along opposite sides thereof, and forwardly from the forward end of the conveyer to the ground. A pair of spaced apart endless chains 38, 38 are guided for orbital movement along the upper side of said apron and along opposite sides of the conveyer in upwardly diverging paths, and have spaced apart gathering arms 39, 39 projecting laterally therefrom (see Figures 1 and 2).

The intermediate transfer conveyer 13 includes a pair of spaced apart side frame members 47, 47 and a bottom plate 49, which side frame members and bottom plate form a frame for a forward receiving portion of said conveyer. Said frame is mounted on said main frame in fixed relation with respect thereto. A pair of spaced side frame members 51, 51, connected together by a bottom plate 52, form a continuation of the side frame members 47, 47 and bottom plate 49 and are mounted at their forward ends on a transversely extending shaft 53, thus affording a means for vertically adjusting the rear end of said transfer conveyer and the discharge conveyer 14.

The conveying elements of the transfer conveyer include a pair of spaced apart endless chains 54, 54 having flights 55, 55 mounted therebetween at intervals therealong. Said endless chains turn around a direction changing device 56 at the discharge end thereof which is similar to the direction changing device 34. A motor 57 is provided to drive said endless chains in a usual manner, which will not herein be shown or described since it is no part of my present invention.

The discharge conveyer 14 projects rearwardly beyond the rear end of the main frame 10 and is pivotally mounted for movement about a vertical axis disposed adjacent the rear of said main frame. Said conveyer includes a pair of spaced apart side frame members 58, 58 connected together by a bottom plate 59.

The vertical pivotal mounting for the discharge conveyer includes a forked bracket 60 extending forwardly from the side frame members 58, 58, the forked portion of which is pivotally mounted on a bracket 61 extending rearwardly from the frame formed by the side frame members 51, 51 and bottom plate 52 of the transfer conveyer 13. It should herein be noted that since the vertical pivotal axis of said conveyer is adjacent the rear of the machine, that the overhang of said conveyer and the tendency of said conveyer to overbalance the machine is reduced from that present in machines provided with an elevating and discharge conveyer arranged in cascade relationship with respect to each other as in the aforementioned prior Patent No. 2,027,091.

The conveying elements of the discharge conveyer include a pair of spaced apart endless chains 62, 62 connected together by transversely extending flights 63, 63 at intervals therealong. A motor 64 is provided for driving said endless chains in a usual manner which will not herein be shown or described since it is no portion of my present invention.

The discharge conveyer is herein shown as being swung from side to side by a hydraulic cylinder 65 pivotally mounted on a bracket 66 extending laterally from the right hand side frame member 51 of the transfer conveyer, when looking towards the forward end of the machine (see Figures 1 and 2). Said cylinder projects rearwardly from said bracket and is provided with a piston rod 67 which is pivotally connected at its outer end to a laterally and forwardly curved bracket 69 which projects from the right hand side frame member 58. Thus when fluid under pressure is admitted to one side or the other of said cylinder, the discharge conveyer 14 may be moved to one side or the other of the track or to a position in alignment with the machine frame, as desired.

A pair of spaced apart fluid pressure cylinders 70, 70 are provided for vertically moving the discharge end of the transfer conveyer 13, and the discharge conveyer 14 about the axis of the transverse shaft 53. Said cylinders are provided with pistons 71, 71 which engage the underside of the frame for the discharge portion of the transfer conveyer 13 (see Figure 1).

Referring now in particular to the novel means to permit the transfer of material from the discharge end of the elevating conveyer 11 to the transfer conveyer 13, and from the discharge end of the transfer conveyer 13 to the discharge conveyer 14 when said conveyers are in various positions of angular adjustment with respect to each other, a transfer plate 74 projects rearwardly from the elevating conveyer 11 and is mounted to pivotally move therewith in a horizontal plane. Said transfer plate rests on the upper side of and has slidable engagement with a plate 75, which has an arcuate shaped forward end and extends forwardly of the frame for the transfer conveyer 13. The gap between the sides of the two conveyers is closed by a pair of hinged closure members 76, 76 guided for slidable movement with the side walls of the elevating and transfer conveyers in guide members 77, 77.

In a like manner the discharge end of the transfer conveyer 13 is provided with a transfer plate 80 which overlaps a plate 81 projecting forwardly from the discharge conveyer 14 and having an arcuate shaped forward end. Hinged closure members 82, 82 are provided to close the gap between sides of said conveyers.

The direction changing devices 34 and 56 and the arrangement whereby said direction changing devices permit material to be transferred from the elevating conveyer 11 to the transfer plate 74 and transfer conveyer 13, and from the transfer conveyer 13 to the transfer plate 80 and discharge conveyer 14, are similar, so the direction changing device 34 at the discharge end of the elevating conveyer need only herein be shown and described in detail.

The direction changing device 34 includes a drum or cylinder 83 secured at its ends to flanges 84, 84 of outwardly projecting flanged sleeves 85, 85 (see Figure 9). Said flanged sleeves are journaled in bearing support members 86, 86 which are secured to the side frame members 29, 29 of the discharge section of the elevating conveyer. Suitable sprockets 87, 87 are secured to the sleeves 85, 85 adjacent the flanges thereof and mesh with and form direction changing devices for the endless chains 32, 32.

The diameter of the outer periphery of the cylinder 83 is larger than the outside diameter of the sprockets 87, 87 and, as herein shown, is slightly greater than the diameter of the arc of the loop of the chains 32, 32 as they round said sprockets. The cylinder 83 is herein preferably shown as being of a split construction and includes one section 88 and another section 89 detachably secured thereto by means of cap screws 90, 90 (see Figure 3). The section 89 is provided with a recessed receiving portion 91 extending therealong which is adapted to successively receive the flights 33, 33 of the conveyer. A rear or retreating wall 93 of said recessed portion is pivotally connected to the rear end of a bottom 94 of said recessed portion on a pivotal pin 95. Said rear wall is adapted to open to permit one of said flights to enter said recess and close after a flight has been received therein to carry said flight around said cylinder, and again open to permit said flight to pass from said cylinder.

The means for opening and closing the retreating wall 93 during certain phases of the cycle of rotation of the cylinder 83 includes an inwardly projecting curved arm 96 herein shown as being formed integral with said retreating wall and projecting inwardly from the transverse central portion of said wall. Said curved arm is of a substantially C-shaped formation and, as herein shown, engages opposite sides of a stationary cam 99 disposed within the limits of said cylinder.

The cam 99 is herein shown as being formed integral with a sleeve 101 which is mounted on the squared ends of aligned shafts 102, 102 (see Figure 9). Said shafts extend through the hollow center of the flanged sleeves 85, 85 and are secured at their ends in brackets 103, 103. Said brackets abut the outer sides of securing flanges 104, 104 of the bearing support members 86, 86 and are secured thereto by means of the same cap screws which secure said bearing support members to the side frame members 25, 25.

The shafts 102, 102 are herein shown as being provided with spiral screws 105, 105 extending therealong. The purpose of said spiral screws is to clear the inside of the cylinder 83 of any fine material which may fall therein.

The cam 99 and arm 96 are arranged to pivot the wall 93 in a direction opposite to the direction of travel of the cylinder 83 to open said wall and permit a flight 33 of the conveyer to be received by the recessed receiving portion 91. As said flight is received in said recessed portion, the retreating wall 93 is pivoted by said cam and arm in the direction of travel of said cylinder to enclose said flight in said recessed portion as is best shown in Figures 3, 4, and 6. This permits material on the conveyer to be moved over the outer surface of said cylinder onto the transfer plate 14 by the next succeeding flight of the conveyer, and permits these flights and the material on the conveyer to move the material across the transfer plate onto the next succeeding conveyer. As the cycle of rotation of said direction changing device advances from the position shown in Figure 6 to the position shown in Figure 7, the rear wall 93 is opened by the cam 99 to permit the flight 33 to pass therefrom.

It will be seen from the foregoing that a new and improved mechanism of a novel construction has been provided to permit the transferring of material from one aligned conveyer to another, the conveying surface of which may be in substantially the same plane as the first conveyer and which is herein shown as being slightly below the conveying surface of the discharge conveyer; and that this is effected by recessing the direction changing device at the discharge end of the conveyer so it may receive successive flights of the conveyer so that the material carried by these flights will be moved over the surface of the direction changing device onto a transfer plate and progressed therealong and discharged therefrom onto the next succeeding conveyer under propulsion from succeeding flights acting through the body of material on said transfer plate. It will also be seen that this transferring mechanism and arrangement of conveyers permits flexibility in movement of the conveyers with respect to each other in both vertical and horizontal directions, and is particularly adapted for use with loading machines where it is desired to maintain the vertical height of the machine to those low compact overall dimensions necessary for operation in thin seams of coal and still retain flexibility in movement of the elevating and discharge conveyers and balance of the machine when said conveyers are to one side or the other of the center line of the track.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In an articulated train of conveyers, a chain flight conveyer, another chain flight conveyer having a receiving end in alignment with the discharge end of said first mentioned conveyer, and having a receiving end disposed above the center about which the flights of said first mentioned conveyer turn at the discharge end thereof, a transfer plate disposed between said conveyers, and a direction changing device at the discharge end of said first mentioned conveyer arranged to permit material to be conveyed thereover by the flights of said conveyer, and transferred onto said transfer plate and said other conveyer, said direction changing device having a recessed portion adapted to receive the successive flights of said associated conveyer.

2. In an articulated train of conveyers, a chain flight conveyer, another chain flight conveyer having a receiving end in alignment with the discharge end of said first mentioned conveyer, and a direction changing device at the discharge end of said first mentioned conveyer arranged to permit material to be conveyed thereover by the flights of said conveyer and transferred onto said other conveyer, said direction changing device having a recessed portion adapted to receive the flights of said associated conveyer, said recessed portion having a pivoted rear wall adapted to open in a direction opposite to the direction of rotation of said direction changing device, and a cam for pivotally moving said wall at predetermined phases in the cycle of rotation of said direction changing device.

3. In an articulated train of conveyers, a chain flight conveyer, another chain flight conveyer having a receiving end in alignment with the discharge end of said first mentioned conveyer, a transfer plate disposed between said conveyers, and a direction changing device at the discharge end of said first mentioned conveyer arranged to permit material to be conveyed thereover by the flights of said conveyer and transferred across said transfer plate onto said other conveyer, said direction changing device having a recessed portion adapted to receive the flights of said associated conveyer, said recessed portion having a pivoted rear wall adapted to open in a direction opposite to the direction of rotation of said direction changing device, and means for pivotally moving said wall at predetermined phases in the cycle of rotation of said direction changing device.

4. In an articulated train of conveyers, a chain flight conveyer, another chain flight conveyer having a receiving end in alignment with the discharge end of said first mentioned conveyer, a transfer plate disposed between said conveyers and having one end overlapping the discharge end of said first mentioned conveyer and an opposite end overlapping the receiving end of said other conveyer, and a direction changing device at the discharge end of said first mentioned conveyer, said direction changing device having a portion, the outer periphery of which is of a greater diameter than the diameter of the inside of the loop of the chains of said conveyer as they round said direction changing device, and said portion being recessed to successively receive the flights of said conveyer as they pass therearound to permit material to be conveyed across said transfer plate onto said other conveyer by the flights of said first mentioned conveyer.

5. A conveyer including an endless chain and a plurality of spaced apart flights, a direction changing device at the discharge end of said conveyer, about which said chain turns, a horizontal transfer plate extending in substantially the same plane as the plane of said conveyer at its discharge end, said direction changing device being arranged to permit material to be conveyed thereover by the flights of said conveyer onto and over said transfer plate, and said direction changing device having a portion, the outer diameter of which is greater than the diameter of curvature of the inside of said chain as it passes therearound, said portion being recessed to successively receive the flights of said conveyer as they pass therearound.

6. A conveyer including an endless chain and a plurality of spaced apart flights, a direction changing device at the discharge end of said conveyer, about which said chain turns, said direction changing device being arranged to permit material to be conveyed thereover by the flights of said conveyer and having a portion, the outer diameter of which is greater than the diameter of curvature of the inside of said chain as it passes therearound, said portion being recessed to successively receive the flights of said conveyer as they pass therearound, said recessed portion including a rear wall which is adapted to open and close to permit the flights of said conveyer to be successively received in said opening, and means for opening and closing said rear wall at predetermined intervals in the cycle of rotation of said direction changing device.

7. A conveyer including an endless chain and a plurality of spaced apart flights, a direction changing device at the discharge end of said conveyer, about which said chain turns, said direction changing device being arranged to permit material to be conveyed thereover by the flights of said conveyer and having a portion, the outer diameter of which is greater than the diameter of curvature of the inside of said chain as it passes therearound, said portion being recessed to successively receive the flights of said conveyer as they pass therearound, said recessed portion including a rear wall which is adapted to open and close to permit the flights of said conveyer to be successively received in said opening, and a cam for opening and closing said rear wall at predetermined intervals in the cycle of rotation of said direction changing device.

8. In a flight conveyer, an endless chain having a plurality of spaced apart flights projecting laterally therefrom, a pan forming the bottom of said conveyer, a substantially horizontal transfer plate at the discharge end of said conveyer disposed above said pan and having a receiving end overlapping the discharge end of said conveyer, and means for permitting said conveyer to move material from said pan onto and across said plate comprising a direction changing device at the discharge end of said conveyer, said direction changing device having a portion in substantially the same horizontal plane as said transfer plate, the radius of the outer periphery of said portion being greater than the radius of curvature of the inside of said chain as it changes its direction around said direction changing device, and said portion being transversely recessed for receiving successive flights of said conveyer.

9. In a flight conveyer, an endless chain having a plurality of spaced apart flights projecting laterally therefrom, a pan forming the bottom of said conveyer, a transfer platform at the discharge end of said conveyer disposed above said pan, and means for permitting said conveyer to move material from said pan onto said platform and across said platform comprising a direction changing device at the discharge end of said conveyer, said direction changing device having a portion, the radius of the outer periphery of which is greater than the radius of curvature of the inside of said chain as it changes its direction around said direction changing device, said portion being transversely recessed for receiving a flight of said conveyer, said recessed portion having a wall thereof which is adapted to open to permit said flights to be successively received in said recessed portion, and close as said respective flight is received therein, and again open to permit said flight to pass therefrom, and means for opening and closing said wall during certain phases of the cycle of rotation of said direction changing device.

10. In a flight conveyer, an endless chain having a plurality of spaced apart flights projecting laterally therefrom, a pan forming the bottom of said conveyer, a transfer platform at the discharge end of said conveyer disposed above said pan, and means for permitting said conveyer to move material from said pan onto said platform and across said platform comprising a direction changing device at the discharge end of said conveyer, said direction changing device having a portion, the radius of the outer periphery of which is greater than the radius of curvature of the inside of said chain as it changes its direction around said direction changing device, said portion being recessed for receiving a flight of said conveyer, said recessed portion having a pivoted wall which is adapted to open to permit respective of said flights to be successively received in said recessed portion, and a cam for opening and closing said pivoted wall at predetermined intervals in the cycle of rotation of said direction changing device.

11. In a flight conveyer, a pair of parallel spaced endless chains having spaced apart flights mounted therebetween, a transfer plate overlapping the discharge end of said conveyer, and a direction changing device at the discharge end of said conveyer arranged to permit the material on the conveyer to be transferred onto and over said plate, said direction changing device having a portion, the diameter of the periphery of which is greater than the diameter of the loop formed by the inside of said chains as they pass therearound, said portion being recessed for successively receiving a flight of said conveyer as it passes therearound, said recessed portion having a wall thereof which is adapted to open to permit said flights to be successively received in said recessed portion, and close as said respective flight is received therein, and means for opening and closing said wall at predetermined intervals in the cycle of rotation of said direction changing device.

12. In a flight conveyer, a pair of parallel spaced endless chains having spaced apart flights mounted therebetween, a transfer plate overlapping the discharge end of said conveyer, and a direction changing device at the discharge end of said conveyer arranged to permit the conveyer to transfer material thereon onto and over said plate, said direction changing device having a portion, the diameter of the periphery of which is greater than the diameter of the inside of the loop of said chains as they pass therearound, said portion being recessed for successively receiving a flight of said conveyer as it passes therearound, said recessed portion having a wall thereof which is adapted to open to receive respective of said flights and close as said respective flight is received therein, a cam, and an arm extending from said wall and having engagement with said cam for opening and closing said wall of said recessed portion at predetermined intervals in the cycle of rotation thereof.

13. In an apparatus of the class described, a flight conveyer mounted for pivotal movement about an axis perpendicular to its plane of travel, another conveyer substantially in alignment with said first mentioned conveyer, said conveyers each including a pair of spaced endless chains having flights mounted therebetween, and means for permitting material to be transferred from one of said conveyers to said other conveyer by the action of the flights of the transferring conveyer when said conveyers are in various positions of adjustment with respect to each other including a direction changing device, a portion of which is of a diameter greater than the diameter of the loop of the inside of said chains as they pass therearound, said portion being transversely recessed for successively receiving the flights of said conveyer as they pass therearound and a transfer plate disposed between said conveyers and having a receiving end overlapping said direction changing device.

14. In an apparatus of the class described, a flight conveyer mounted for pivotal movement about an axis perpendicular to its plane of travel, another conveyer substantially in alignment with said first mentioned conveyer, said conveyers each including a pair of spaced endless chains having flights mounted therebetween, and means for permitting material to be transferred from one of said conveyers to said other conveyer by the action of the flights of the transferring conveyer when said conveyers are in various positions of adjustment with respect to each other including a direction changing device, a portion of which is of a diameter greater than the diameter of the loop of the inside of said chains as they pass therearound, said portion being recessed for successively receiving the flights of said conveyer as they pass therearound, said recessed portion having a wall thereof which is adapted to open to receive respective of said flights and close as said respective flight is received therein, and cam means for opening and closing said wall of said recessed portion at predetermined intervals in the cycle of rotation thereof.

15. In a loading machine of the class described, a frame, an elevating chain flight conveyer mounted on said frame for pivotal movement with respect thereto about a vertical axis, an aligned intermediate chain flight transfer conveyer disposed rearwardly of said elevating conveyer and extending rearwardly along said frame and having a receiving end disposed in a plane above the center about which the chains of said elevating conveyer turn at the discharge end thereof, and a discharge conveyer having a receiving end disposed in a plane above the center about which the chains of said transfer conveyer turn at the discharge end thereof and mounted on said frame for pivotal movement about a vertical axis disposed adjacent the rearward end of said frame, and means associated with said elevating and transfer conveyers for permitting said elevating conveyer to transfer material to said transfer conveyer and permitting said transfer conveyer to transfer material to said discharge conveyer when said elevating and discharge conveyers are in various positions of pivotal adjustment with respect to said transfer conveyer.

16. In a loading machine of the class described, a frame, an elevating chain flight conveyer mounted on said frame for pivotal movement with respect thereto about a vertical axis, an aligned intermediate chain flight transfer conveyer disposed rearwardly of said elevating conveyer and extending rearwardly along said frame and having a receiving end disposed in a plane above the center about which the chains of said elevating conveyer turn at the discharge end thereof, and a discharge conveyer having a receiving end disposed in a plane above the center about which the chains of said transfer conveyer turn at the discharge end thereof and mounted on said frame for pivotal movement about a vertical axis disposed adjacent the rearward end of said frame, and means associated with said elevating and transfer conveyers for permitting said elevating conveyer to transfer material to said transfer conveyer and permitting said transfer conveyer to transfer material to said discharge conveyer when said elevating and discharge conveyers are in various positions of pivotal adjustment with respect to said transfer conveyer including direction changing devices at the discharge ends of said elevating and transfer conveyers, each of said direction changing devices having a portion which is of a greater diameter than the diameter of the inside of the loop of the chains of said conveyers at the discharge end thereof, said portions each being transversely recessed for successively receiving the flights of said respective conveyers as they pass therearound.

17. In a loading machine of the class described, a frame, an elevating chain flight conveyer mounted on said frame for pivotal movement with respect thereto about a vertical axis, an aligned intermediate chain flight transfer conveyer disposed rearwardly of said elevating conveyer and extending rearwardly along said frame and having a receiving end disposed in a plane above the center about which the chains of said elevating conveyer turn at the discharge end thereof, and a discharge conveyer having a receiving end disposed in a plane above the center about which the chains of said transfer conveyer turn at the discharge end thereof and mounted on said frame for pivotal movement about a vertical axis disposed adjacent the rearward end of said frame, and means associated with said elevating and transfer conveyers for permitting said elevating conveyer to transfer material to said transfer conveyer and permitting said transfer conveyer to transfer material to said discharge conveyer when said elevating and discharge conveyers are in various positions of pivotal adjustment with respect to said transfer conveyer including direction changing devices at the discharge ends of said elevating and transfer conveyers, each of said direction changing devices having a portion which is of a greater diameter than the diameter of the inside of the loop of the chains of said conveyers at the discharge end thereof, said portions each having a recessed portion formed therein for successively receiving the flights of said respective conveyers as they pass therearound, said recessed portions each including a movable wall, and cam means for moving said wall to an open or closed position at predetermined phases of the cycle of rotation of said direction changing device.

18. In a loading machine of the class described, a frame, an elevating chain flight conveyer mounted on said frame for pivotal movement with respect thereto about a vertical axis, an aligned intermediate chain flight transfer conveyer disposed rearwardly of said elevating conveyer and extending rearwardly along said frame and having a receiving end disposed in a plane above the center about which the chains of said elevating conveyer turn at the discharge end thereof, and a discharge conveyer having a receiving end disposed in a plane above the center about which the chains of said transfer conveyer turn at the discharge end thereof and mounted on said frame for pivotal movement about a vertical axis disposed adjacent the rearward end of said frame, and means associated with said elevating and transfer conveyers for permitting said elevating conveyer to transfer material to said transfer conveyer and permitting said transfer conveyer to transfer material to said discharge conveyer when said elevating and discharge conveyers are in various positions of adjustment with respect to each other including a transfer plate disposed between said elevating and transfer conveyers, another transfer plate disposed between said transfer and discharge conveyers, and direction changing devices at the discharge ends of said elevating and transfer conveyers and overlapped by said transfer plates, each of said direction changing devices having a portion which is of a greater diameter than the diameter of the inside of the loop of the conveyer chains passing therearound, and said portions being recessed to successively receive the flights of said respective conveyers as they pass therearound.

19. In a loading machine of the class described, a frame, an elevating chain flight conveyer mounted on said frame for pivotal movement with respect thereto about a vertical axis, an aligned intermediate chain flight transfer conveyer disposed rearwardly of said elevating conveyer and extending rearwardly along said frame and having a receiving end disposed in a plane above the center about which the chains of said elevating conveyer turn at the discharge end thereof, and a discharge conveyer having a receiving end disposed in a plane above the center about which the chains of said transfer conveyer turn at the discharge end thereof and mounted on said frame for pivotal movement about a vertical axis disposed adjacent the rearward end of said frame, and means associated with said elevating and transfer conveyers for permitting said elevating conveyer to transfer material to said transfer conveyer and permitting said transfer conveyer to transfer material to said discharge conveyer when said elevating and discharge conveyers are in various positions of adjustment with respect to each other including a transfer plate disposed between said elevating and transfer conveyers, another transfer plate disposed between said transfer and discharge conveyers, and direction changing devices at the discharge ends of said elevating and transfer conveyers and overlapped by said transfer plates, each of said direction changing devices having a portion which is of a greater diameter than the diameter of the inside of the loop of the conveyer chains passing therearound, and said portions being recessed to successively receive the flights of said respective conveyers as they pass therearound and having a retreating wall adapted to pivot to open up said recess during certain phases of the cycle of rotation thereof, and a cam for controlling pivotal movement of said retreating wall.

20. In a train of conveyers, a chain flight conveyer having spaced flights movable along the upper surface thereof, a transfer plate at the discharge end of said conveyer disposed in a substantially horizontal plane, a direction changing device for said chain flights disposed immediately adjacent said transfer plate with its upper surface disposed in substantially the same horizontal plane as said transfer plate, said direction changing device having a recessed portion adapted to receive the successive flights of said conveyer, and arranged so that the material carried by successive flights will be deposited on said transfer plate and progressed therealong and discharged therefrom under propulsion from succeeding flights acting through the body of material on said transfer plate.

21. In a loading machine of the class described, a frame, an elevating chain flight conveyer mounted on said frame for pivotal movement with respect thereto about a vertical axis, an aligned intermediate chain flight transfer conveyer disposed rearwardly of said elevating conveyer and extending rearwardly along said frame and having a receiving end spaced longitudinally from the discharge end of said elevating conveyer a transfer plate between said conveyers for permitting material to be transferred from one conveyer to the other, and a discharge conveyer having a receiving end spaced longitudinally from the discharge end of said intermediate conveyer and mounted on said frame for pivotal movement about a vertical axis disposed adjacent the rear end of said frame, a transfer plate between said conveyers for permitting material to be transferred from one conveyer to the other, and direction changing devices for the chains and flights of said elevating and intermediate conveyers, said direction changing devices each having a recessed portion adapted to receive the successive flights of said conveyer, and arranged so that the material carried by the successive flights will be deposited on said transfer plate and progressed therealong and discharged therefrom under propulsion from succeeding flights acting through the body of material on said transfer plate.

WILLIAM W. SLOANE.